United States Patent
Kieffer

(10) Patent No.: US 7,931,852 B2
(45) Date of Patent: Apr. 26, 2011

(54) PROCESS AND APPARATUS FOR REINFORCED POLYMER COMPOSITES

(76) Inventor: Terry Kieffer, Preston, IA (US)

( * ) Notice: Subject to any disclaimer, the term of this patent is extended or adjusted under 35 U.S.C. 154(b) by 718 days.

(21) Appl. No.: 11/900,950

(22) Filed: Sep. 14, 2007

(65) Prior Publication Data

US 2008/0023867 A1    Jan. 31, 2008

Related U.S. Application Data

(63) Continuation-in-part of application No. 10/906,155, filed on Feb. 4, 2005, now abandoned.

(51) Int. Cl.
B29C 70/36 (2006.01)
(52) U.S. Cl. .......................... 264/571; 264/101; 264/316
(58) Field of Classification Search .................. 264/571, 264/101, 102, 316; 425/389, 405.1
See application file for complete search history.

(56) References Cited

U.S. PATENT DOCUMENTS

| | | | | |
|---|---|---|---|---|
| 3,861,977 A * | 1/1975 | Wiley | | 156/242 |
| 4,178,406 A | 12/1979 | Russell | | |
| 4,201,823 A | 5/1980 | Russell | | |
| 4,816,106 A * | 3/1989 | Turris et al. | | 156/285 |
| 4,942,013 A * | 7/1990 | Palmer et al. | | 264/511 |
| 5,023,042 A | 6/1991 | Efferding | | |
| 5,052,906 A | 10/1991 | Seemann | | |
| 5,059,377 A * | 10/1991 | Ashton et al. | | 264/257 |
| 5,129,813 A | 7/1992 | Shepherd | | |
| 5,281,388 A | 1/1994 | Palmer et al. | | |
| 5,322,665 A | 6/1994 | Bernardon et al. | | |
| 5,439,631 A | 8/1995 | Schneider et al. | | |
| 5,464,337 A * | 11/1995 | Bernardon et al. | | 425/112 |
| 5,665,301 A * | 9/1997 | Alanko | | 425/389 |
| 5,820,894 A * | 10/1998 | Kreutzer | | 425/389 |
| 5,932,256 A | 8/1999 | Mandish | | |
| 6,017,484 A * | 1/2000 | Hale | | 264/510 |
| 6,551,091 B1 | 4/2003 | Bryant et al. | | |
| 6,555,045 B2 | 4/2003 | McClure | | |
| 6,609,633 B1 | 8/2003 | Dyble et al. | | |
| 6,620,369 B1 * | 9/2003 | Mead | | 264/510 |
| 6,630,095 B2 * | 10/2003 | Slaughter et al. | | 264/510 |
| 6,676,882 B2 | 1/2004 | Benson et al. | | |
| 6,723,271 B2 | 4/2004 | Hemphill et al. | | |
| 7,029,267 B2 * | 4/2006 | Caron | | 425/389 |
| 7,147,448 B2 * | 12/2006 | Slaughter et al. | | 425/129.1 |
| 7,258,828 B2 * | 8/2007 | Fish | | 264/257 |
| 2002/0149134 A1 | 10/2002 | Hemphill et al. | | |
| 2002/0185785 A1 | 12/2002 | Thrash et al. | | |

* cited by examiner

Primary Examiner — Joseph S Del Sole
Assistant Examiner — Ryan Ochylski
(74) Attorney, Agent, or Firm — Hamilton IP Law, PC.; Jay R. Hamilton; Charles A. Damschen

(57) ABSTRACT

A method for structurally reinforcing a part is disclosed. The method comprising forming a part into a desired shape; placing the part on a holding fixture; introducing a substrate lay-up of a reinforcing material onto at least a portion of the part; placing a flexible sheet impermeable to a resin of the reinforcing material over a portion of the part having the substrate lay-up of said reinforcing material placed on the part, wherein the flexible sheet includes at least one injection port; evacuating all air and vapor from a pocket between the flexible sheet and the part; introducing the resin of the reinforcing material into the pocket through the at least one injection port; allowing the substrate and the resin of the reinforcing material to cure at least partially; and, removing the flexible sheet from the part.

7 Claims, 10 Drawing Sheets

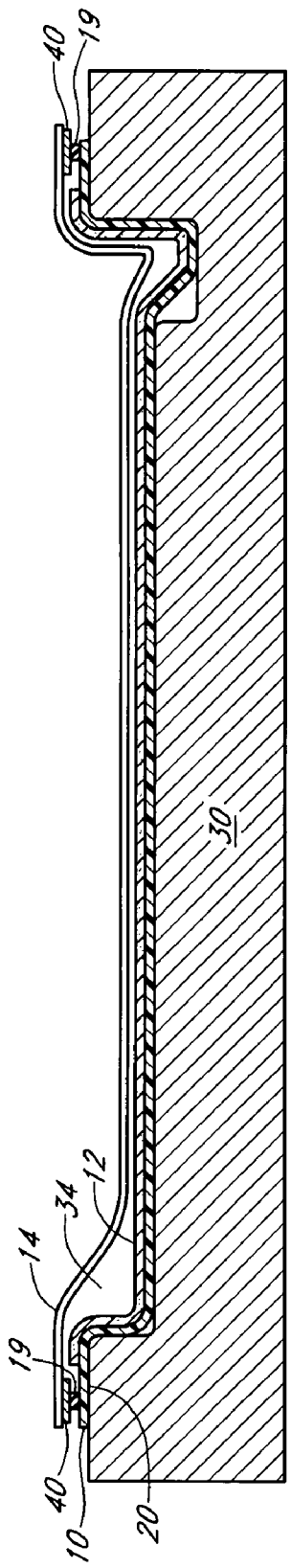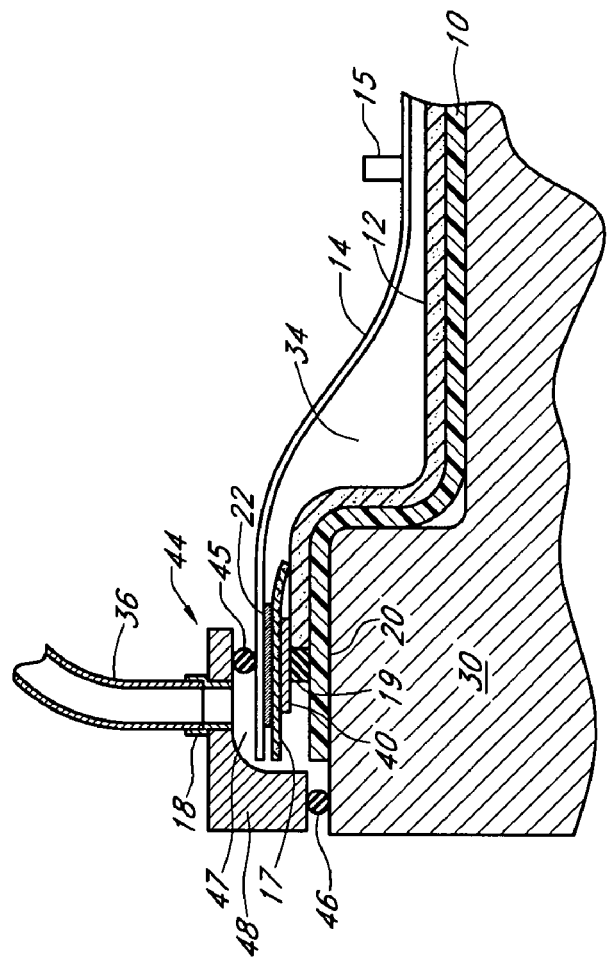

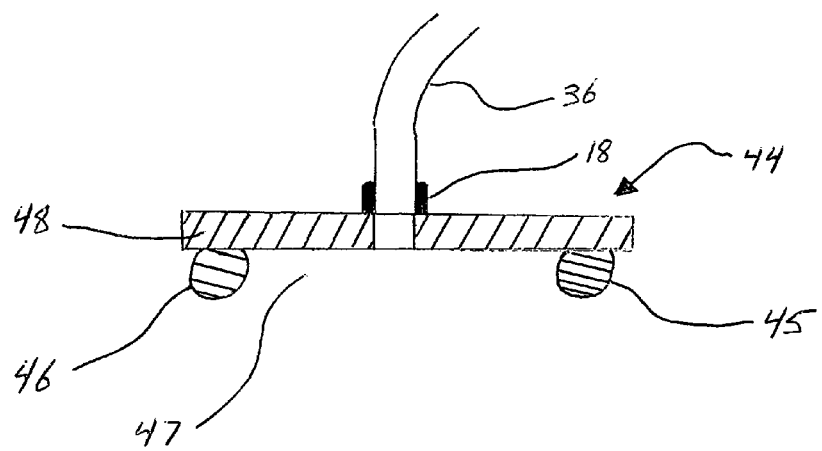
FIG. 9
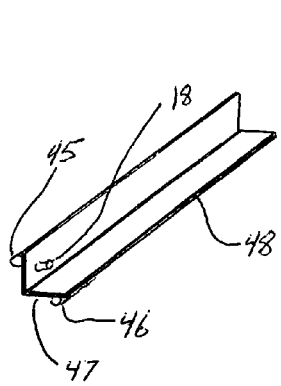
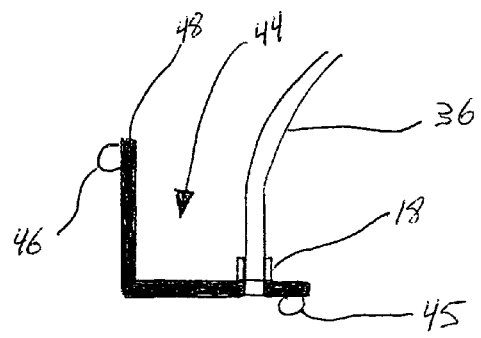
FIG. 10        FIG. 10A

PROCESS AND APPARATUS FOR REINFORCED POLYMER COMPOSITES

CROSS REFERENCE TO RELATED APPLICATIONS

The present application is a continuation-in-part of previously filed non-provisional patent application Ser. No. 10/906,155 entitled "Improved Vacuum Bag Process for Reinforced Composites" filed on Feb. 4, 2005 now abandoned. Applicant herein claims priority from said patent application and incorporates said patent application by reference herein.

FIELD OF INVENTION

The present invention relates to a new method for reinforcing a part. More specifically, the present invention provides for a novel method for introduction of the reinforcing material resin to a reinforcing material substrate, a novel method for forming a protruding member of a reinforcing material, and a novel apparatus for carrying out the both methods.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BRIEF DESCRIPTION OF THE FIGURES

FIG. 2 is a side cutaway view of the exemplary embodiment of a part placed in a holding fixture with no resin wicks or breathable strips, and before the double-lip seal member is put into place.

FIG. 3 is a detailed cutaway view showing the interfaces of several elements in the exemplary embodiment (without a reinforcing material protruding member) with the double-lip seal member.

FIG. 9 shows a side cutaway view of the double-lip seal member from the embodiment shown in FIG. 1, wherein the first and second seals are in the same plane and face the same direction.

FIG. 10 is a perspective view of a portion of the double-lip seal member wherein the first and second seals are in different planes and face different directions.

FIG. 10A shows a side cutaway view of the double-lip seal member shown in FIG. 10.

Figure 1:
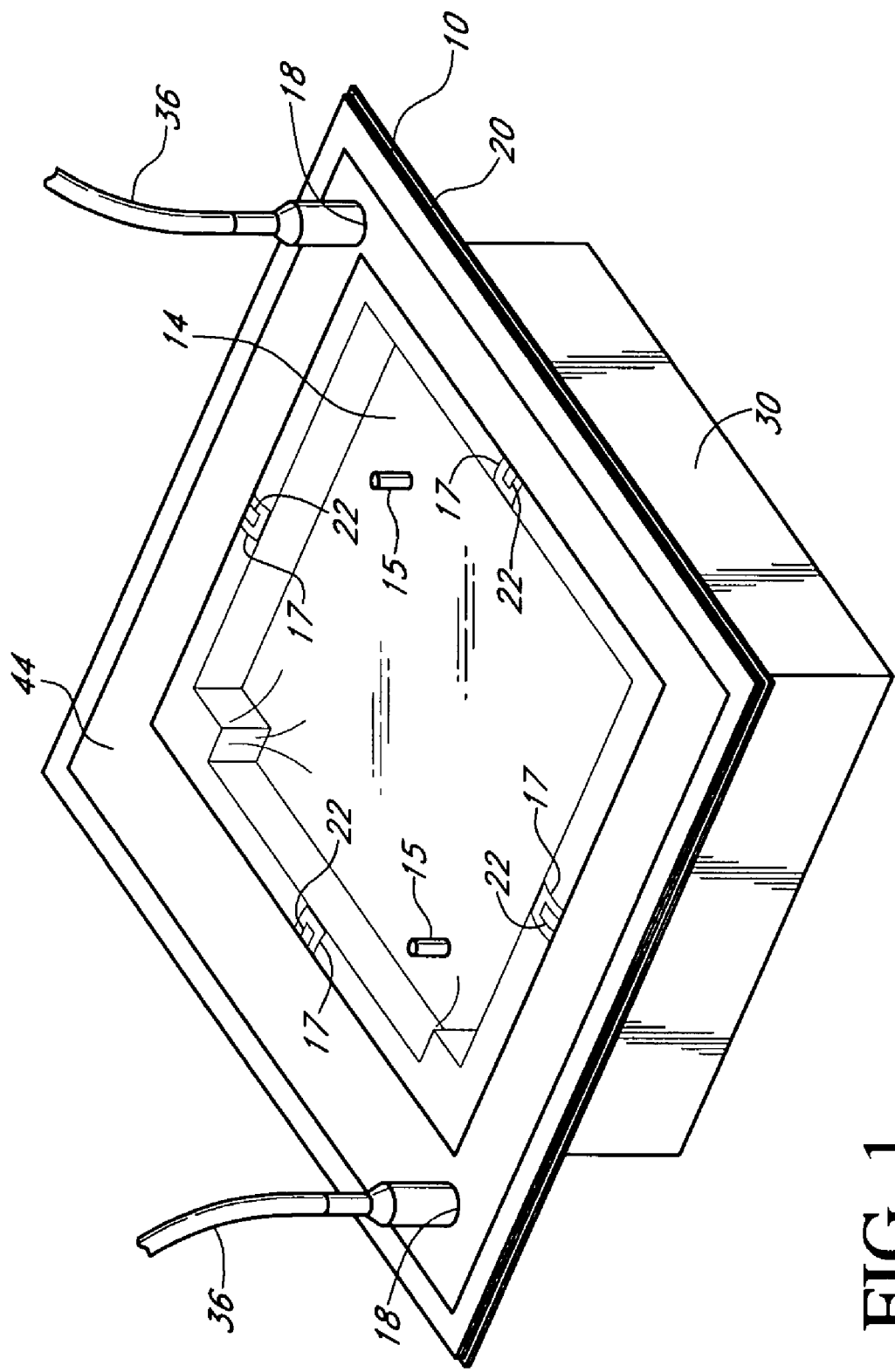
FIG. 1 is a perspective view of one embodiment of a part after the pocket has been evacuated of air and/or vapor but before the resin has been introduced.

| DETAILED DESCRIPTION - LISTING OF ELEMENTS | |
| --- | --- |
| ELEMENT DESCRIPTION | ELEMENT # |
| Part | 10 |
| Substrate Lay-up | 12 |
| Resin | 13 |
| Flexible Sheet | 14 |
| Injection Port | 15 |
| Channel | 16 |
| Resin Wick | 17 |
| Opening | 18 |
| Sealing Substrate | 19 |
| Flange | 20 |
| Breathable Strip | 22 |
| Holding Fixture | 30 |
| Additional Structure | 32 |
| Pocket | 34 |
| Vacuum Hose | 36 |
| Bracket | 40 |
| Reinforcing Material Protruding Member | 42 |
| Bracket Protruding Member | 43 |
| Double-Lip Seal Member | 44 |
| First Seal | 45 |
| Second Seal | 46 |
| Inner Area | 47 |
| Frame | 48 |

DETAILED DESCRIPTION

Before explaining one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. The figures pictured and described herein are not intended to limit the scope of the present invention in any way, and different relative dimensions among the various elements may occur without departure from the scope of the present disclosure.

FIG. 1 shows a part 10 placed in a holding fixture 30. The part 10 may be formed by any method that is appropriate for the application of the part 10, including but not limited to thermoforming, injection molding, or extrusion. Furthermore, the part 10 may be composed of any material that is suitable for the particular application of the part 10, including but not limited to polypropylene, polymethylmethacralate, polystyrene, abs, acrylic, polyethylene, or butadiene. After the part 10 is formed to the desired shape and sufficiently cured, depending on the forming method and material used in the part 10, the part 10 is placed in a holding fixture 30. Depending on the specific requirements for the finished product, the holding fixture 30 may simply be a rough frame maintaining loose tolerances between the holding fixture 30 and the part 10, such as a simple frame made by wooden beams (e.g., two-by-fours), or any similar structure utilizing suitable material. Alternatively, the holding fixture 30 may be formed to substantially the same shape and size as the part 10 so that the part 10 fits into the holding fixture 30 with very close tolerances throughout the interface between the part 10 and the holding fixture 30. The holding fixture 30 may be made of any suitable material, including but not limited to wood, polymer materials, and silicone or fiberglass materials. Generally, the surface of the part 10 that is to be reinforced is facing away from the holding fixture 30 and will comprise the interior portion of the finished product, and the surface of the part engaged with the holding fixture 10 will not have reinforcing material directly applied thereto and will comprise the exterior portion of the finished product.

Figure 2A:
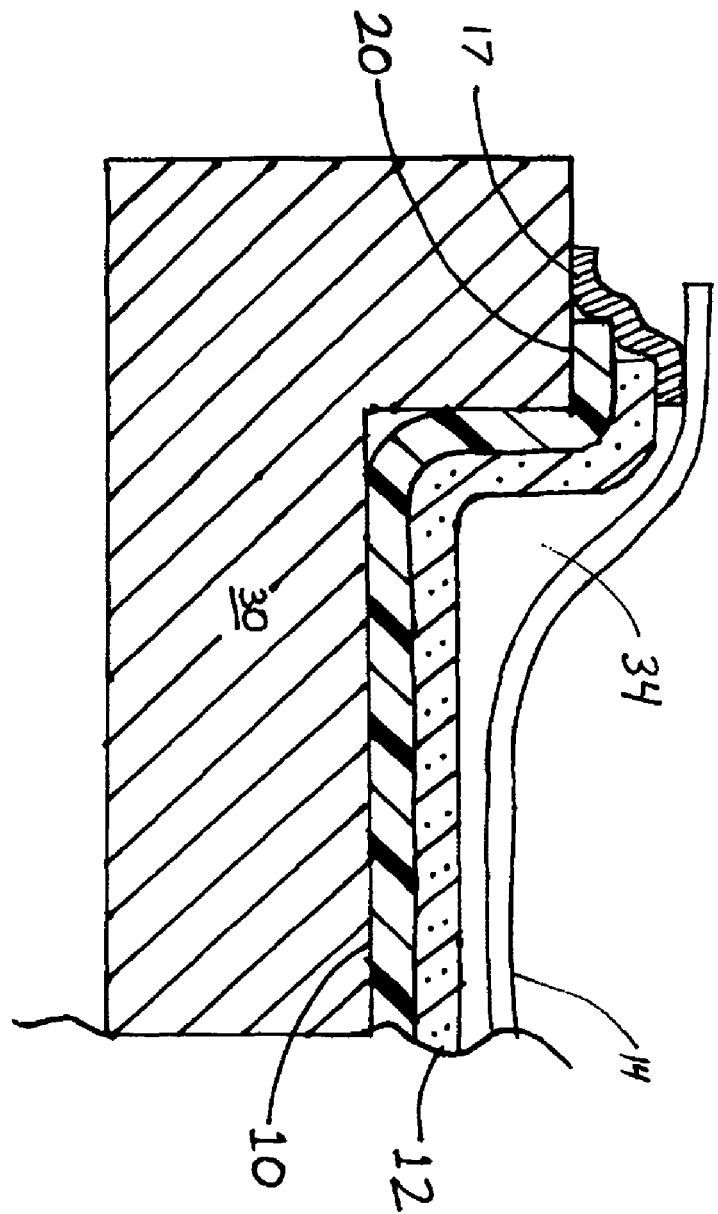
FIG. 2A is a side cutaway view of a part placed in a holding fixture without a sealing substrate or bracket with the resin wick in place, before the double-lip seal member is put in place.
Figure 5:
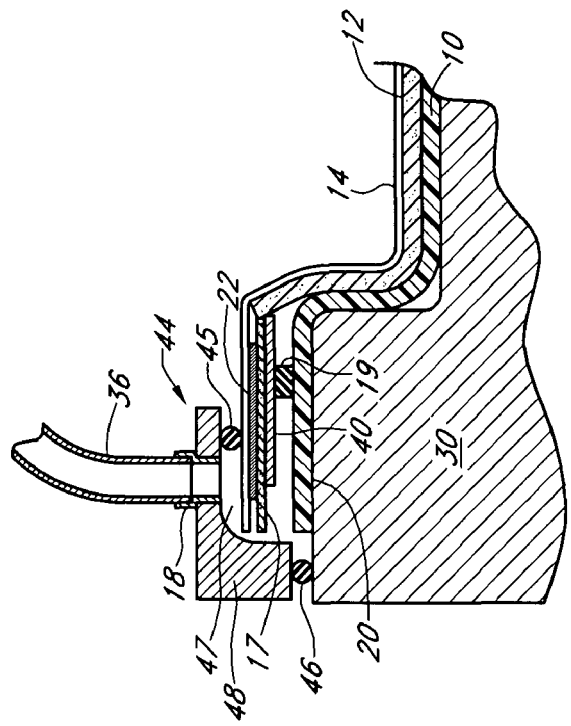
FIG. 5 shows a side cutaway view of the exemplary embodiment of a part placed in a holding fixture after the pocket has been evacuated of air and/or vapor.

As shown in FIG. 2, after the part 10 is placed in the holding fixture 30, a sealing substrate 19 is positioned around the outer portion of the part 10. The sealing substrate 19 is generally impermeable to air at ambient conditions, but may have different functionalities and mechanical properties depending on the specific embodiment. In some applications, the part 10 may be formed with a flange 20 around the outer portion. In such cases, the sealing substrate may be applied to the flange 20. Generally, the flange 20 is expendable and provides for a portion of the part 10 that may be trimmed and discarded, so that the flange 20 is not present in the finished part 10. Next, substrate lay-up 12 is placed adjacent the part 10 in the portions of the part 10 that are to be reinforced. For maximum reinforcement, it is required that the substrate lay-up 12 follow the contours of the part 10 as closely as possible. Alternatively, as illustrated in FIG. 2A, the part may be placed in the holding fixture 30, without a sealing substrate 19 or bracket 40, with the resin wick 17 overlapping the part 10 and substrate lay-up 12.

Figure 8:
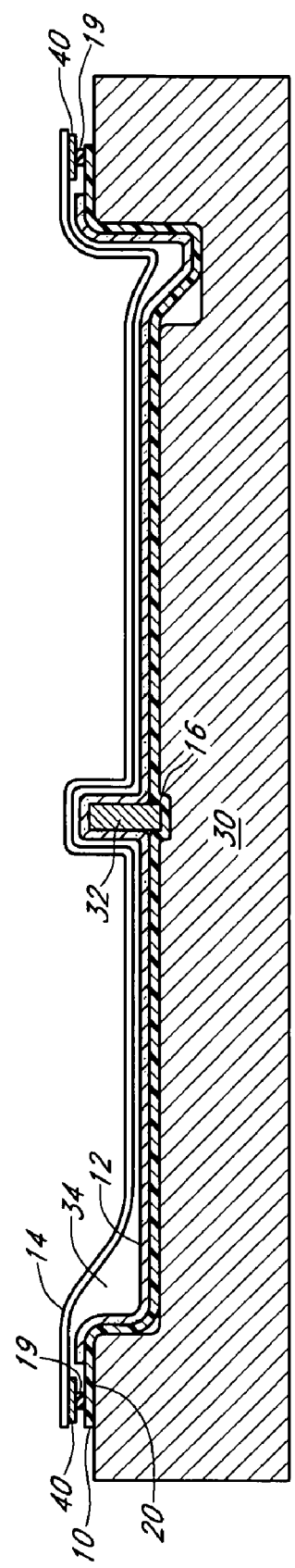
FIG. 8 shows a side cutaway view of the exemplary embodiment of a part formed with a channel and an additional structure placed in the channel.

In certain parts 10, channels 16 are formed in specific areas of the part 10. The channels 16 are formed to accept additional structures 32, such as a wooden shelf, as shown in FIG. 8. To ensure the additional structure 32 is sufficiently adhered to the part 10, substrate lay-up 12 should be placed at the interface between the additional structure 32 and the part 10 (adjacent the channel 16). If additional reinforcement for the additional structure 32 is desired, a larger portion of the additional structure 32 may be covered with substrate lay-up 12. In FIG. 8, the entire outer surface of the additional structure 32 is covered with substrate lay-up 12 to provide maximum reinforcement. In an alternative embodiment not shown herein but obvious to those of skill in the art in light of the present disclosure, the part 10 need not include channels 16 to accept additional structures 32 in each instance an additional structure 32 is desired. Instead, a bracket 40 (to be described in detail below) may be used to ensure the proper orientation between the additional structure 32 and the part 10 without the use of channels 16 or other receiving structures formed in the part 10.

Figure 4:
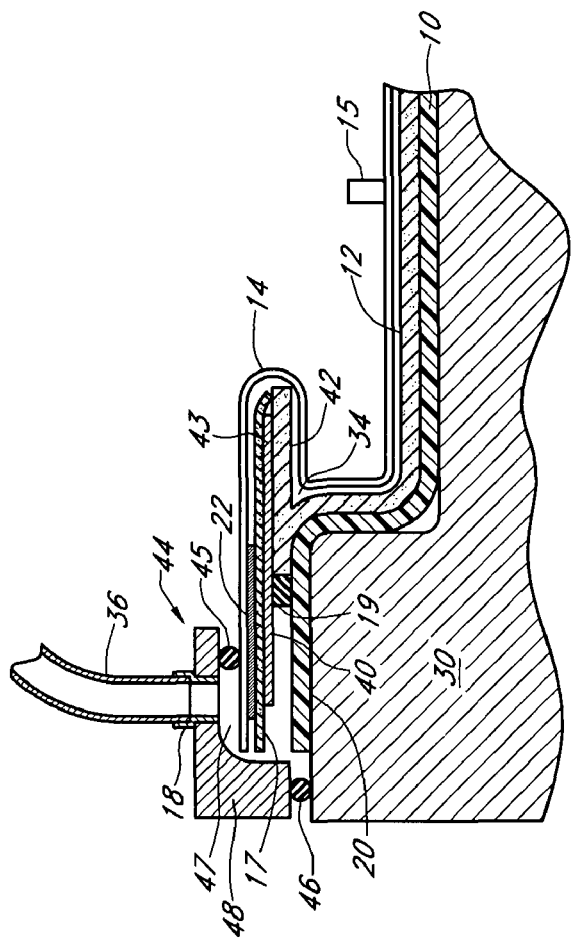
FIG. 4 is a detailed cutaway view showing the interfaces of several elements in the exemplary embodiment with a reinforcing material protruding member and the double-lip seal member as the pocket is being evacuated of air and/or vapor.
Figure 6:
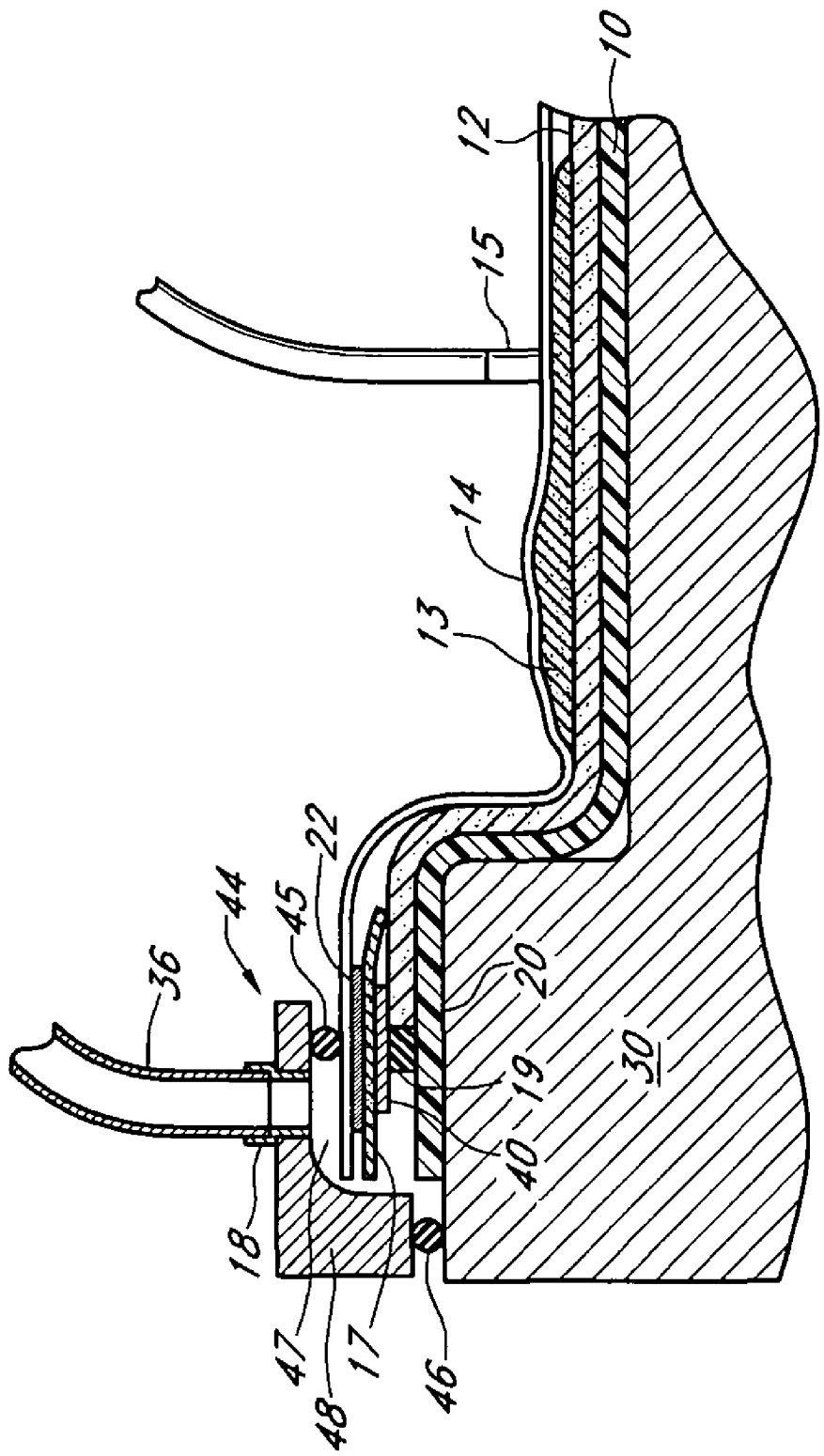
FIG. 6 shows a side cutaway view of the exemplary embodiment of a part placed in a holding fixture as resin is introduced to the substrate lay-up.

If the finished product is required to include a reinforcing material protruding member 42, a bracket 40 is next placed over the sealing substrate 19 as illustrated in FIG. 4. Generally, the bracket 40 is capable of forming a hermetic seal between the sealing substrate 19 and the bracket 40 and is chemically inert and impermeable with respect to the substrate lay-up 12 and resin 13. The bracket 40 may be constructed of any suitable material, including but not limited to aluminum, polymer material, wood, or metal. Furthermore, the bracket 40 may be formed with a recessed channel (not shown) to accept a portion the sealing substrate 19. Although this embodiment is not pictured herein, it will become obvious to those skilled in the art that, in view of the entire disclosure, this embodiment would look very similar to that shown in FIGS. 3-7. The main difference being that a portion of the sealing substrate 19 would fit into the recessed channel (not shown) in the bracket 40, and therefore the distance between the holding fixture 30 and the first seal 45 would be reduced relative to that shown in FIGS. 3-7. However, as stated above, the relative dimensions of the various elements in no way limit the scope of the present invention.

In some embodiments, the bracket 40 includes a bracket protruding member 43 that is substantially the same size and shape as the desired reinforcing protruding member 42 (see FIG. 4). Substrate lay-up 12 is placed along the desired surface of the bracket protruding member 43 where the reinforcing material protruding member 42 is desired. Resin wicks 17 may then be placed at various locations around the bracket 40, as shown in FIG. 4. Resin wicks 17 are made of a material that is permeable to resin 13 and serve to draw resin 13 from areas of high resin 13 concentration to areas of low resin 13 concentration, as is well known to those skilled in the art. Generally, the length of the resin wicks 17 is adjusted so that one end of the resin wicks 17 contacts the substrate lay-up 12 and the opposite end extends past the bracket 40 away from the part 10 to the edge of the part 10 or the flange 20, depending on the specific part 10. The resin wicks 17 are positioned so that resin 13 is evenly distributed throughout the entirety of the substrate lay-up 12 when the resin 13 is introduced to the substrate lay-up 12, as described in detail below. A breathable strip 22 may be placed over a portion of the resin wicks 17 to facilitate the ability to create a vacuum later in the process, as described in detail below.

At this point, a flexible sheet 14 is spread over the entire bracket 40 and the portion of the part 10 that has been covered with substrate lay-up 12. The flexible sheet 14 may be made of any suitably durable, chemical resistant, and flexible material. In the exemplary embodiment, the flexible sheet 14 is made of silicon adhered to polypropylene netting. Generally, the flexible sheet 14 should be formed to approximate the size and shape of the portion of the part 10 adjacent the flexible sheet 14. The closer the clearances between all portions of the part 10 and the sheet 14, the more likely it is that resin 13 will migrate (during steps described in detail below) to all areas to which substrate lay-up 12 has been applied. The flexible sheet 14 is impermeable to resin 13 and capable of creating a hermetic seal between the flexible sheet 14 and the bracket 40; as well as between the flexible sheet 14 and the resin wicks 17. The flexible sheet 14 may be formed with at least one injection port 15 for introducing resin 13 to an area adjacent the flexible sheet 14. Resin 13 may be supplied to the injection ports 15 through any means known to those skilled in the art, such as through any type of pump, as explained in more detail below. If present, the injection ports 15 should be sealed when the flexible sheet 14 is placed and when the area adjacent the flexible sheet 14 is evacuated (as described below) to ensure no air leaks through the injection ports 15. For purposes of clarity, the area between the flexible sheet 14 and the portion of the part 10 covered with substrate lay-up 12 (i.e., the portion of the part 10 to be reinforced) is hereinafter referred to as the pocket 34. (See FIGS. 2-3.) Alternatively, as shown in FIG. 2A, for some applications, bracket 40 may be disregarded and sufficient engagement created between resin wick 17, flexible sheet 14 and fixture 30.

If the flexible sheet 14 is not formed with injection ports 15, resin 13 may be introduced into the pocket 34 via a conduit (not shown) running through the holding fixture 30 and the part 10. It is generally preferable that this conduit (not shown) be placed on a waste portion of the part 10, such as the flange 20, which will not be present in the final part 10.

Figure 11:
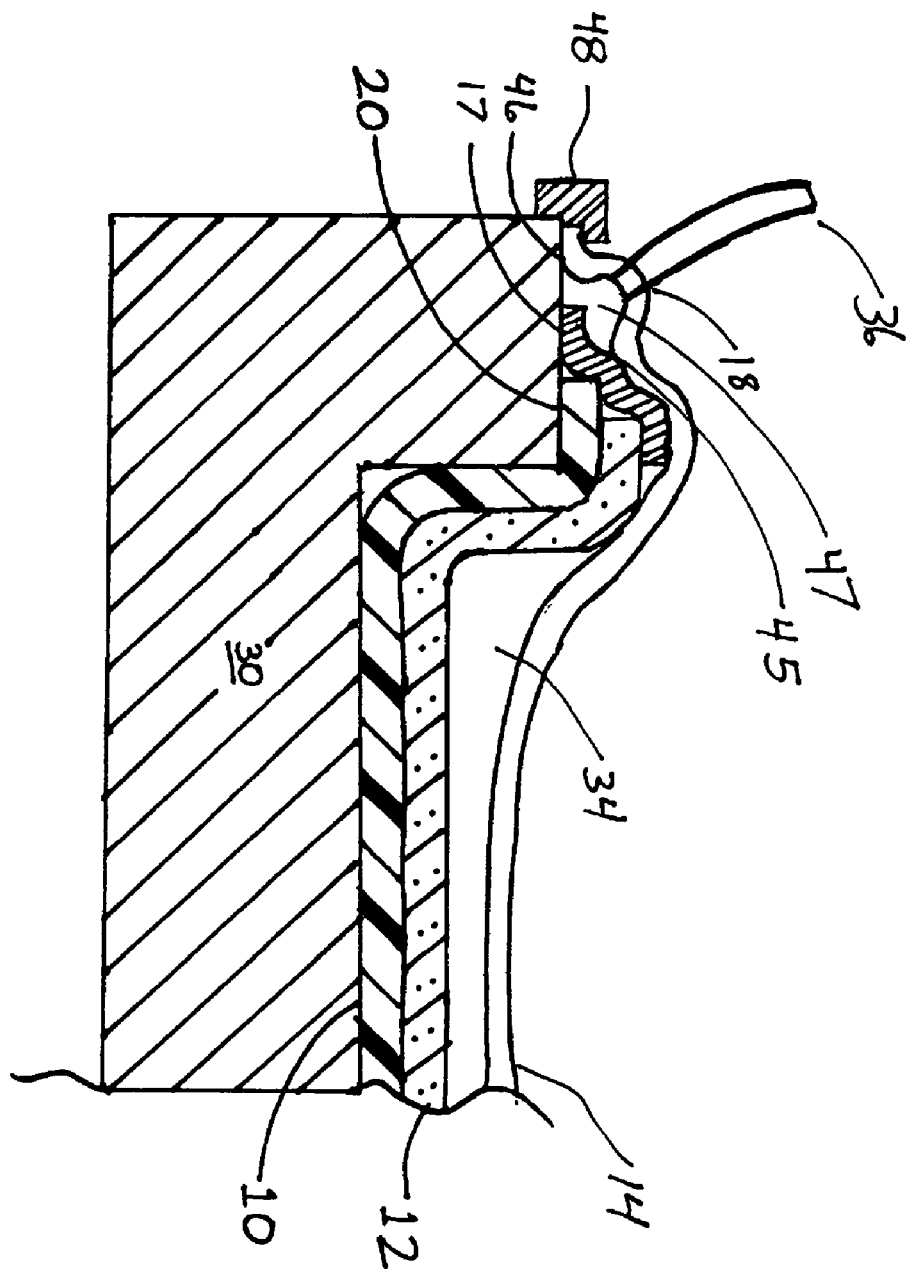
FIG. 11 shows another embodiment of the process for creating a reinforced polymer wherein the frame does not include double seals.

A double-lip seal member 44 is next placed around the periphery of flexible sheet 14. The double-lip seal member 44 includes a frame 48 that may be made of any suitable material, including but not limited to wood, polymer material, or metal. The double-lip seal member 44 includes a first seal 45 and a second seal 46, each of which are affixed to one surface of the frame 48, which may be located in the same or different planes depending on the specific embodiment of the frame 48, and which function to provide hermetic seals as described below. FIGS. 3-7 show an embodiment of the double-lip seal member 44 wherein the first seal 45 and second seal 46 are in different planes, but both face the same general direction. FIG. 9 shows an embodiment of the double-lip seal member 44 wherein the first seal 45 and second seal 46 are in the same plane and face the same direction. In certain applications this type of double-lip seal member 44 may be useful with a bracket 40 having a recessed channel (not shown) as described above. FIGS. 10 and 10A show an embodiment of the double-lip seal member 44 wherein the first seal 45 and second seal 46 are in different planes and face different directions. FIG. 11 illustrates As is readily apparent to those skilled in the art, the embodiments shown and described herein of the double-lip seal member 44 for achieving differing orientations of the first seal 45 and second seal 46 are but a sample of an infinite number of such orientations, and are meant to illustrative only and in no way limit the scope of the present invention. Additionally, as illustrated in FIG. 11, sealing members 44, 45, 46 and 48 can be incorporated and integrated into elements 14 or 30. FIG. 11 is meant to be illustrative only and in no way limit the scope of the present invention.

In the exemplary embodiment, the double-lip seal member 44 also includes at least one opening 18 for the attachment of a vacuum hose 36 or the like. The opening(s) 18 are placed adjacent an inner area 47 positioned between the first seal 45 and second seal 46 and protrude from the frame 48. The first seal 45 is generally of a lesser periphery than the second seal 46 and of a lesser periphery than the outer periphery of the part 10 (or flange 20). The first seal 45 abuts the flexible sheet 14 and seals the inner area 47 of the double-lip seal member 44 from the external environment by engaging a portion of the flexible sheet 14. The periphery of the second seal 46 extends to or beyond the outer periphery of the part 10 or the flange 20 and creates a hermetic seal between the inner area 47 of the double-lip seal member 44 and the holding fixture 30 by engaging a portion of the holding fixture 30. The second seal 46 generally shares the same shape as the first seal 45 and both seals 45, 46 generally share the same shape as the outer periphery of the part 10 (or flange 20). Both seals 45, 46 are constructed of a material sufficiently flexible and distortable so that they are capable of providing a hermetic seal with a plurality of different surfaces. The first seal 45 and second seal 46 need not be made of the same material in any specific embodiment, and may differ depending on the embodiment of the holding fixture 30 and/or flexible sheet 14. Possible suitable materials for the seals 45, 46 include but are not limited to rubber, polypropylene, or high density polyethylene.

A vacuum hose 36 is coupled to the opening(s) 18 in the double-lip seal member 44 and any vapor or gas present in the pocket 34 and/or in the area between the part 10 and the holding fixture 30 (on the opposite surface of the part 10) is evacuated using a vacuum pump (not shown) coupled to the vacuum hose 36. Besides evacuating all air and other gases and/or vapors, the application of vacuum causes the flexible sheet 14 to substantially conform to the contour of the surface of the part 10 that is to be reinforced, the contour of the surface of any additional structure 32, and/or the contour of any bracket protruding member 43. Breathable strips 22 that are permeable to air may be placed over a portion of the resin wicks 17 between the resin wicks 17 and the flexible sheet 14 (if resin wicks 17 are used) so that the vacuum hose 36 is able to draw air from the pocket 34. The breathable strips 22 are required for some applications to allow evacuation of this area because as noted, the sealing substrate 19 provides a hermetic seal between the bracket 40 and the part 10, the flexible sheet 14 provides a hermetic seal between the flexible sheet 14 and the bracket 40 (and any resin wicks 17), and the first seal 45 provides a hermetic seal between the inner area 47 of the double-lip seal member 44 and the flexible sheet 14. In some applications, resin wicks 17 may provide enough air flow to allow evacuation of the area without breathable strips 22. Therefore, the only path through which air may flow from the pocket 34 to the vacuum hose 36 is through the breathable strips 22 and or resin wick 17. The second seal 46 is required to prevent the vacuum hose 36 from pulling ambient air from the atmosphere around the holding fixture 30 or part 10 into the inner area 47 of the double-lip seal member 44 while simultaneously allowing the vacuum hose 36 to evacuate any air/vapors present between the part 10 and the holding fixture 30. In some embodiments, the pressure differential between the pocket 34 and the resin supply (not shown) may be sufficient to provide the motive force for introducing resin 13 into the pocket.

A double-lip seal member 44 is not required in every embodiment of the present invention. The main advantage of the double-lip seal member 44 is that it allows the pressure to be equalized on both sides of the part 10, the side adjacent the holding fixture 30 and the side adjacent the flexible sheet 14. If additional structures 32 are needed in the final product and the pressure on the two sides of the part 10 is not equalized, the vacuum and the resultant force of the flexible bag 14 on the additional structure 32 may cause the additional structure 32 to stress the part 10 at the interface of the additional structure 32 and the part 10 and create sight lines on the exterior surface of the part 10 (i.e., the surface of the part 10 that is adjacent the holding fixture 30).

After the pocket 34 and the area between the part 10 and the holding fixture 30 has been sufficiently evacuated of air and vapor, resin 13 is introduced into the pocket 34 through injection port(s) 15 if the flexible sheet 14 includes injection ports 15. The vacuum causes the resin 13 to migrate through the substrate lay-up 12 (between the part 10 and the flexible sheet 14) evenly and in a uniform manner. The resin wicks 17 draw resin 13 to any difficult portions of the part 10 that are to be reinforced, such as tight contours in the part 10 or to areas to which the resin 13 is required to migrate against the force of gravity. The injection ports 15 may be strategically placed on the flexible sheet 14 to ensure resin 13 migration towards all substrate lay-up 12, including substrate lay-up 12 in the areas of a reinforcing material protruding member 42 and/or additional structures 32 (if required). Once resin 13 has sufficiently migrated towards all the substrate lay-up 12 required, the injection ports 15 are sealed and the resin 13 and substrate lay-up are allowed to interact with each other and the part 10 to cure into the reinforcing material. If an additional structure 32 is needed in the part 10, it may be necessary to physically manipulate the outside of the flexible sheet 14 to ensure resin 13 has migrated to all desired portions of substrate lay-up 12. Because the resin 13 is introduced under vacuum, the amount of styrene produced during the process is minimized. Depending on the convention used to test and measure emissions, it is believed that range of emissions is 7.0-10.0 pounds of styrene per ton of resin 13 used.

Figure 7:
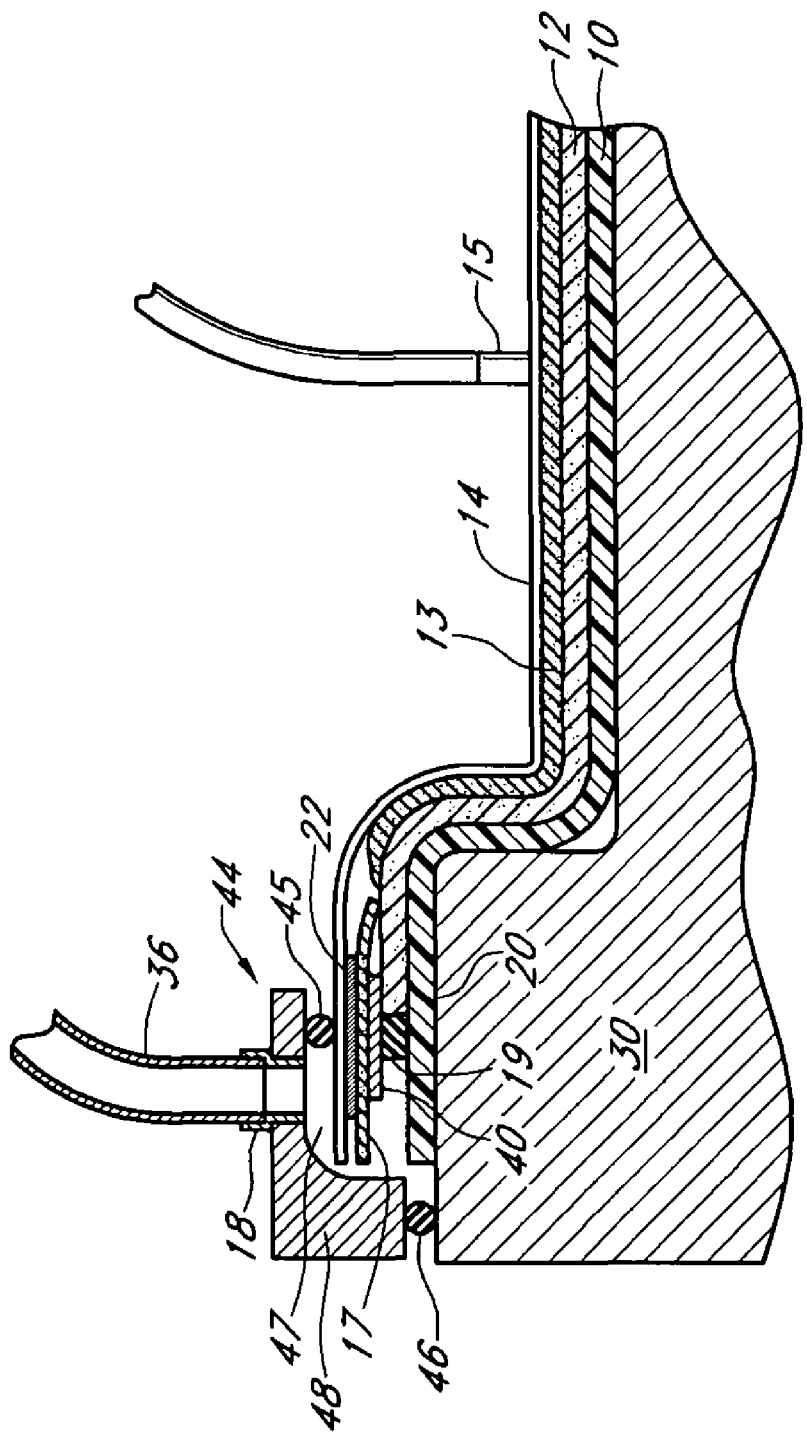
FIG. 7 shows a side cutaway view of the exemplary embodiment of a part placed in a holding fixture after resin has migrated to all desired substrate lay-up.
Figure 7A:
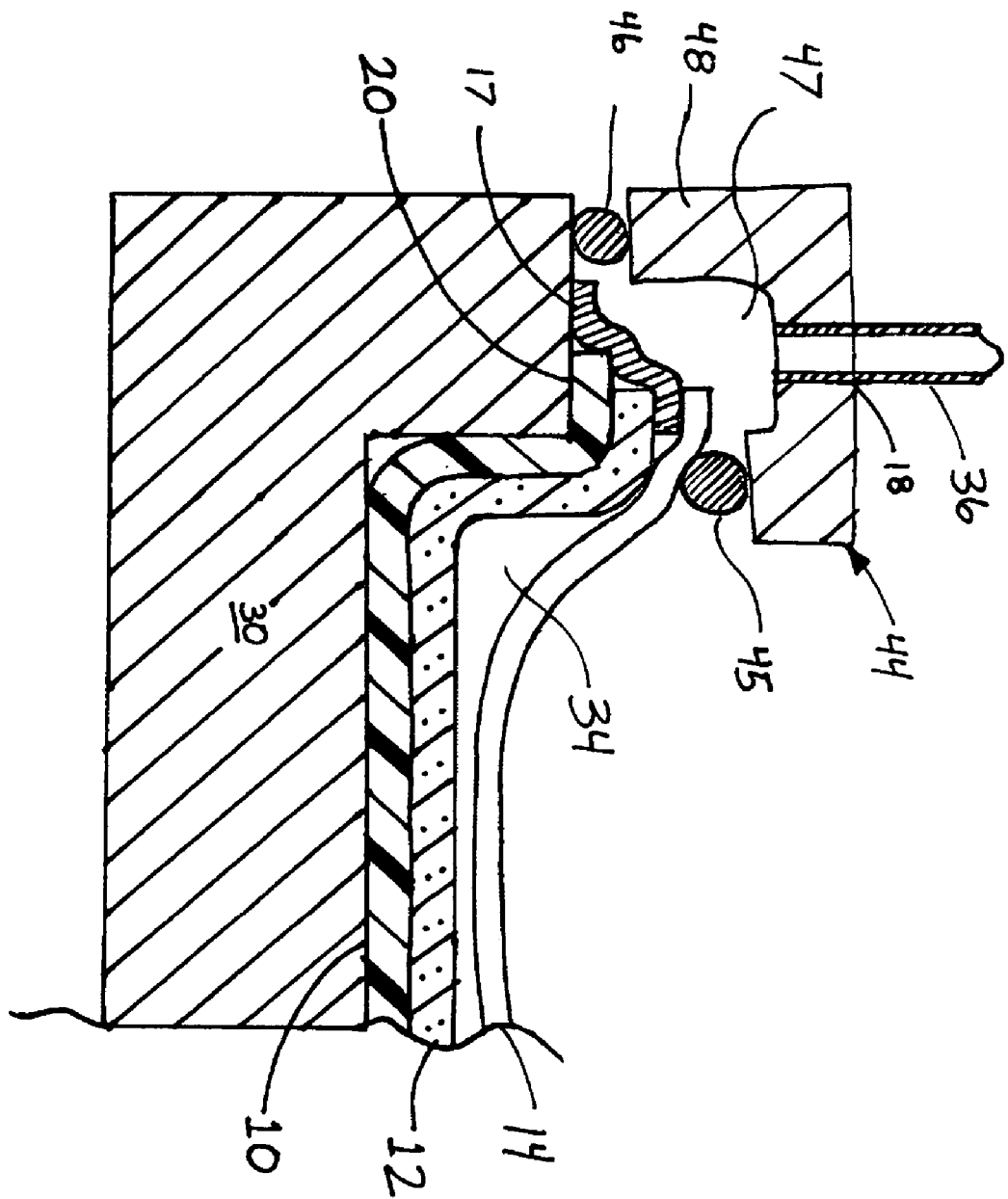
FIG. 7A shows a side cutaway view of a part placed in a holding fixture after resin has migrated to all desired substrate lay-up without a sealing substrate or bracket being used.

In some embodiments pictured and described herein, the first seal 45 and second seal 46 are applied to surfaces of the double-lip seal member 44 that are configured in different planes. As shown in FIG. 7, the first seal 45 is oriented at a higher elevation than the second seal 46. This embodiment allows for the double-lip seal member 44 to be used in conjunction with a vacuum pump to evacuate air and/or vapors from the pocket 34 and the area between the part 10 and the holding fixture 30 even if the distance between the holding fixture 30 and the flexible sheet 14 is considerable. The embodiment shown in FIGS. 1 and 9 shows an embodiment of the double-lip seal member 44 wherein the first seal 45 and second seal 46 are in the same plane and face the same direction, which is best suited for applications wherein the distance between the holding fixture 30 and the flexible sheet 14 is not large.

After the reinforcing material has sufficiently cured, the opening(s) 18 in the double-lip seal member 44 may be opened to ambient pressure and the double-lip seal member 44 may be removed. Next, the flexible sheet 14, resin wicks 17, and breathable strips 22 (if used), and bracket 40 may be removed. The part 10 may then be disengaged from the holding fixture 30 for further processing in accordance with the specifications for the part 10.

The present invention may be used with any type of substrate lay-up 12 or resin 13 suitable for the particular application. More specifically, suitable substrate lay-up 12 materials include but are not limited to Kevlar®, carbon fiber, organic fibers, or common fiberglass fibers. The resin 13 used is dictated by the substrate lay-up 12 material used, as is well known to those skilled in the art.

In an alternative embodiment not pictured herein, the double-lip seal member 44 is not formed with any openings 18. Instead, at least one separate pathway (not shown) is formed in the double-lip seal member 44. As is known to those skilled in the art, the pathway (not shown) may serve to accommodate a vacuum hose 36 when evacuating the pocket 34, and/or may also be used to supply resin 13 to the pocket 34 after the pocket 34 has been evacuated. In such an embodiment, the flexible sheet 14 need not be formed with injection ports 15.

It should be noted that the present invention is not limited to the specific embodiments pictured and described herein, but is intended to apply to all similar methods and apparatuses for reinforcing a part. Accordingly, modifications and alterations from the pictured and/or described embodiments will occur to those skilled in the art without departure from the spirit and scope of the present invention.

The invention claimed is:

1. A method for structurally reinforcing a part, said method comprising:
   a. forming said part into a desired shape;
   b. placing said part on a holding fixture;
   c. affixing a sealing substrate adjacent a periphery of said part;
   d. introducing a substrate lay-up of a reinforcing material onto at least a portion of said part;
   e. placing an additional structure into a channel formed in said part;
   f. placing said substrate lay-up of said reinforcing material onto a portion of said additional structure that engages said channel;
   g. placing a flexible sheet impermeable to a resin of said reinforcing material over a portion of said part having said substrate lay-up of said reinforcing material placed on said part;
   h. evacuating all air and vapor from a pocket between said flexible sheet and said part;
   i. introducing said resin of said reinforcing material into said pocket;
   j. allowing said substrate and said resin of said reinforcing material to cure at least partially;
   k. removing said flexible sheet from said part;
   l. applying a bracket to said sealing substrate after a portion of said substrate lay-up of said reinforcing material has been introduced to said part wherein said bracket includes a protruding member; and,
   m. applying additional substrate lay-up of said reinforcing material to at least a portion of said protruding member of said bracket.

2. The method according to claim 1 wherein said bracket is further defined as being operable to orient and support an additional structure placed adjacent said part.

3. The method according to claim 1 further comprising placing at least one resin wick on said bracket after applying said additional substrate lay-up.

4. The method according to claim 3 further comprising placing at least one breathable strip on said resin wick after placing said at least one resin wick on said bracket.

5. A method for forming a reinforcing material protruding member comprising:
   a. forming a part into a desired shape;
   b. placing said part on a holding fixture;
   c. applying a sealing substrate to a portion of said part;
   d. introducing a substrate lay-up of a reinforcing material onto at least a portion of said part;
   e. placing a bracket on said sealing substrate wherein said bracket includes a bracket protruding member;
   f. applying an additional amount of said substrate lay-up of said reinforcing material to said bracket protruding member;
   g. placing a flexible sheet impermeable to a resin of said reinforcing material over a portion of said part and said bracket having said substrate lay-up of said reinforcing material placed thereon, wherein said flexible sheet includes at least one injection port;
   h. evacuating all air and vapor from a pocket between said flexible sheet and said part;
   i. introducing said resin of said reinforcing material into said pocket through said at least one injection port;
   j. allowing said substrate and said resin of said reinforcing material to cure at least partially; and,
   k. removing said flexible sheet from said part.

6. A method for reinforcing a part comprising:
   a. forming a part into a desired shape;
   b. placing said part on a holding fixture;
   c. applying a sealing substrate to a portion of said part;
   d. introducing a substrate lay-up of a reinforcing material onto at least a portion said part;
   e. placing a bracket on said sealing substrate wherein said bracket includes a bracket protruding member;
   f. applying an additional amount of said substrate lay-up of said reinforcing material to said bracket protruding member;
   g. placing at least one resin wick on said bracket, wherein said at least one resin wick includes a first and second end, wherein said resin wick first end contacts said substrate lay-up, and wherein said resin wick second end extends to at least an outer periphery of said part;
h. placing a breathable strip on top of said at least one resin wick wherein said breathable strip extends at least from an area adjacent said outer periphery of said part to an edge of said bracket opposite said area adjacent said outer periphery of said part;
i. placing a flexible sheet impermeable to a resin of said reinforcing material over a portion of said part having said substrate lay-up of said reinforcing material placed thereon, wherein said flexible sheet includes at least one injection port;
j. evacuating all air and vapor from a pocket between said flexible sheet and said part;
k. introducing said resin of said reinforcing material into said pocket through said at least one injection port;
l. allowing said substrate and said resin of said reinforcing material to cure at least partially; and,
m. removing said flexible sheet from said part.

7. A method for reinforcing a part comprising:
a. forming a part into a desired shape;
b. placing said part on a holding fixture;
c. applying a sealing substrate to a portion of said part;
d. introducing a substrate lay-up of a reinforcing material onto at least a portion of said part;
e. placing a bracket on said sealing substrate wherein said bracket includes a bracket protruding member;
f. applying an additional amount of said substrate lay-up of said reinforcing material to said bracket protruding member;
g. placing at least one resin wick on said bracket, wherein said at least one resin wick includes a first and second end, wherein said resin wick first end contacts said substrate lay-up, and wherein said resin wick second end extends to at least an outer periphery of said part;
h. placing a breathable strip on top of said at least one resin wick wherein said breathable strip extends at least from an area adjacent said outer periphery of said part to an edge of said bracket opposite said area adjacent said outer periphery of said part;
i. placing a flexible sheet impermeable to a resin of said reinforcing material over a portion of said part having said substrate lay-up of said reinforcing material placed thereon, wherein said flexible sheet includes at least one injection port;
j. placing a double-lip seal member over a portion of said flexible sheet and a portion of said holding fixture, wherein said double-lip seal member includes an inner area between a first seal and a second seal, wherein said first seal abuts said flexible sheet, wherein said second seal abuts said holding fixture, and wherein said double-lip seal member includes at least one opening in fluid communication with said inner area;
k. attaching at least one vacuum hose to said at least one opening on said double-lip seal member;
l. evacuating the air and/or vapor from a pocket between said flexible sheet and said part while simultaneously evacuating the air and/or vapor between said part and said holding fixture;
m. introducing said resin of said reinforcing material into said pocket through said at least one injection port;
n. allowing said substrate and said resin of said reinforcing material to at least partially cure; and,
o. removing said flexible sheet from said part.

* * * * *